US005667857A

United States Patent [19]

Watanabe et al.

[11] Patent Number: 5,667,857
[45] Date of Patent: Sep. 16, 1997

[54] TOE PUFF FOR SAFETY SHOE

[75] Inventors: Shoichi Watanabe; Hirokazu Inoguchi, both of Fukushima; Yoshihiro Kanzaka, Nyuzen-machi; Yoshiharu Tanaka, Nyuzen-machi; Hideji Ikehara, Nyuzen-machi; Ryuji Saiki, Kurobe; Nobukatsu Yamato, Asahi-machi; Tomohiro Mori, Kurobe; Minoru Senna, Uozu, all of Japan

[73] Assignee: Nitto Boseki Co., Ltd., Fukushima, Japan

[21] Appl. No.: 692,244

[22] Filed: Aug. 7, 1996

Related U.S. Application Data

[62] Division of Ser. No. 127,452, Sep. 23, 1993, Pat. No. 5,560,985, which is a continuation of Ser. No. 860,789, Mar. 31, 1992, abandoned.

[30] Foreign Application Priority Data

| Apr. 3, 1991 | [JP] | Japan | 3-096025 |
| Sep. 18, 1991 | [JP] | Japan | 3-267153 |
| Oct. 3, 1991 | [JP] | Japan | 3-256586 |
| Feb. 28, 1992 | [JP] | Japan | 4-079046 |

[51] Int. Cl.$^6$ ............................................. B29D 22/00
[52] U.S. Cl. ........................... 422/36.2; 36/77 R; 36/77 M
[58] Field of Search ........................... 428/36.2; 36/77 R, 36/77 M

[56] References Cited

U.S. PATENT DOCUMENTS

| 3,778,251 | 12/1973 | Trask | 117/68 |
| 4,350,732 | 9/1982 | Goodwin | 428/246 |
| 4,469,543 | 9/1984 | Segal et al. | 156/283 |

FOREIGN PATENT DOCUMENTS

| 0 100 181 | 2/1984 | European Pat. Off. . |
| 0 259 121 | 3/1988 | European Pat. Off. . |
| 2 289 338 | 5/1976 | France . |

OTHER PUBLICATIONS

*Derwent Abstract of French No.* 2 289 338 Jul. 1976.

*Primary Examiner*—Christopher Raimund
*Attorney, Agent, or Firm*—Flynn, Thiel, Boutell & Tanis, P.C.

[57] ABSTRACT

The present invention provides a molding sheet material having a sandwich structure produced by preparing a fiber reinforced thermoplastic resin layer (A) reinforced with a woven fabric or a knitted web and a fiber reinforced thermoplastic resin layer (B) reinforced with a random mat and using the layer (A) as a core layer and the layer (B) as a skin layer, or using the layer (B) as a core layer and the layer (A) as a skin layer. When this sheet material is molded into a three-dimensional structure, the layer (B) serves as a cushion to prevent the occurrence of a wrinkle or a crease in the layer (A). A toe puff for a safety shoe having a light weight and excellent pressing resistance can be prepared through the molding of this sheet material. In the sheet materials, the core layer or the skin layer consisting of a thermoplastic resin reinforced with a woven fabric or a knitted web of a reinforcing fiber may be prepared from a woven fabric or a knitted web of a reinforcing fiber alone.

12 Claims, 6 Drawing Sheets

TOE PUFF FOR SAFETY SHOE

This is a division of Ser. No. 08/127,452, filed Sep. 27, 1993 now U.S. Pat. No. 5,560,985, which is a continuation of Ser. No. 07/860,789, filed Mar. 31, 1992 now abandoned.

BACKGROUND OF THE INVENTION

1. Field of the Invention

The present invention relates to a molding sheet material of a fiber reinforced thermoplastic resin used in hot stamping or high-speed compression molding, particularly to a molding sheet material suitable for use in the molding of an article having a relatively large thickness and a deeply drawn three-dimensional structure and suitable for use in the field where a mechanical strength is required. Further, the present invention relates to a toe puff for a shoe produced by molding the above-described molding sheet material, particularly to a toe puff for a safety shoe which can be applied to shoes, such as shoes and boots, to reinforce the structure of the shoe puff, thereby enhancing the safety of the shoes.

2. Description of the Prior Art

A molding sheet material of a fiber reinforced thermoplastic resin which has hitherto been used in hot stamping or high-speed compression molding comprises a fiber reinforced thermoplastic resin reinforced with a reinforcement such as a chopped strand mat, a filament mat or a nonwoven fabric, each used singly. In recent years, a sheet material for stamping molding reinforced with a unidirectional reinforcement consisting of doubled reinforcing fibers has also been developed.

In a toe puff of a safety shoe, a great importance has hitherto been attached to the strength of the upper of a shoe for the protection against the dropping of a heavy material, and only a shoe puff consisting of a steel has been put to practical use. Since, however, the steel toe puff has a large weight, there occurs a problem with the workability of a person wearing such shoes. For this reason, in recent years, a toe puff for a safety shoe consisting of a thermoplastic resin reinforced with a reinforcing filament, such as a glass fiber, has been proposed for the purpose of reducing the weight of the toe puff. For example, Japanese Utility Model Publication No. 42402/1986 proposes a toe puff for a safety shoe produced by subjecting a base material consisting of a glass filament composited with a thermoplastic resin matrix to heat molding under pressure, and Japanese Utility Model Publication No. 64304/1987 proposes a toe puff for a shoe produced by press molding, injection molding or the like through the use of a filament in the form of a cloth, a yarn, a braid, a mat or the like.

Molded articles produced from a molding sheet material reinforced with the conventional mat or nonwoven fabric, however, has a low strength, which renders the molded articles unsuitable for applications where a high strength is required. When the above-described sheet material is subjected to deep drawing, it is partially elongated to a large extent. In the excessively elongated portion, the reinforcement as well is elongated. This lowers the strength and reduces the thickness unfavorably. In this respect as well, the sheet material is unsuitable as a toe puff for a safety shoe. On the other hand, in the sheet material reinforced with a unidirectional reinforcement, it is a matter of course that the directionality occurs in the strength of the molded article, which renders such a sheet material unsuitable for the production of a molded article where a high strength is required independently of the directionality, such as a toe puff for a safety shoe.

When a woven fabric or a knitted web is used as a reinforcement for the molding sheet material, it is conceivable that the resultant article is satisfactory in respect of both the strength and the directionality. Since, however, the molding sheet material wherein the woven fabric or knitted web is used as the reinforcement is difficult to elongate and bend, when the sheet material is molded into a three-dimensional structure, wrinkling or creasing occurs in the bend, so that no good molding can be conducted. For this reason, at the present time, such a molding sheet material is not put to practical use.

SUMMARY OF THE INVENTION

The present invention has been made in view of the above-described problems of the prior art, and an object of the present invention is to provide a molding sheet material which has a woven fabric or a knitted web as a reinforcement and, in the molding of a three-dimensional structure by hot stamping or high-speed compression molding, can be molded into an article having a high strength without occurrence of wrinkling or creasing.

Another object of the present invention is to provide a novel thermoplastic resin toe puff for a safety shoe having a strength conforming to the specifications for toe puffs of safety shoes (JIS T 8101 Leather Safety Shoes, Class L).

The present inventors have made extensive and intensive studies with a view to attaining the above-described objects and, as a result, have found that a very excellent moldability and an improvement in the strength can be attained by joining a fiber reinforced thermoplastic resin layer reinforced with a random mat or a sheet of a reinforcing fiber, such as a nonwoven fabric, a filament mat, a chopped strand mat or a continuous strand mat, that is, a random mat to a fiber reinforced thermoplastic resin layer reinforced with a woven fabric or a knitted web of a reinforcing fiber to form a sandwich structure, which has led to the completion of the present invention.

This invention provides molding sheet materials having sandwich structures as specified below:

A molding sheet material having a sandwich structure consisting of a core layer of a fiber reinforced thermoplastic resin reinforced with a woven fabric or a knitted web of a reinforcing fiber and, joined to both sides of the core layer, skin layers of a fiber reinforced thermoplastic resin reinforced with a random mat of a reinforcing fiber.

A molding sheet material having a sandwich structure consisting of a core layer of a fiber reinforced thermoplastic resin reinforced with a random mat of a reinforcing fiber and, joined to both sides of the core layer, skin layers of a fiber reinforced thermoplastic resin reinforced with a woven fabric or a knitted web of a reinforcing fiber.

In the above-described molding sheet materials, the core layer or the skin layer consisting of a fiber reinforced thermoplastic resin reinforced with a woven fabric or a knitted web of a reinforcing fiber may be prepared from a woven fabric or a knitted web of a reinforcing fiber alone.

The present invention further provides a toe puff for a safety shoe produced by subjecting the above molding sheet material to heat molding under pressure.

DETAILED DESCRIPTION OF THE PREFERRED EMBODIMENTS

Figure 1A:
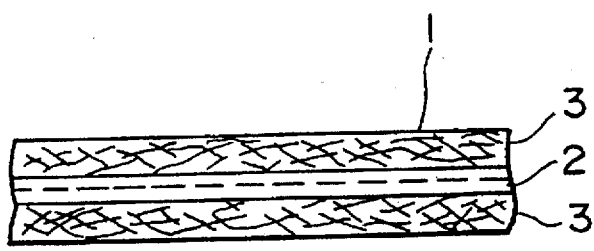
FIG. 1(a) is a schematic cross-sectional view of a structure of a molding sheet material described in claim 1.

Specifically, as shown in FIG. 1(a), the present invention described in claim 1 consists in a molding sheet material 1 characterized by having a sandwich structure consisting of a core layer 2 of a fiber reinforced thermoplastic resin reinforced with a woven fabric or a knitted web of a reinforcing fiber and, joined to both sides of the core layer 2, skin layers 3 of a fiber reinforced thermoplastic resin reinforced with a random mat of a reinforcing fiber.

Figure 1B:
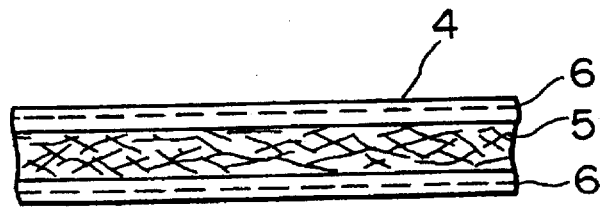
FIG. 1(b) is a schematic cross-sectional view of a structure of a molding sheet material described in claim 2.

As shown in FIG. 1(b), the present invention described in claim 2 consists in a molding sheet material 4 characterized by having a sandwich structure consisting of a core layer 5 of a fiber reinforced thermoplastic resin reinforced with a random mat of a reinforcing fiber and, joined to both sides of the core layer 5, skin layers 6 of a fiber reinforced thermoplastic resin reinforced with a woven fabric or a knitted web of a reinforcing fiber.

Figure 3:
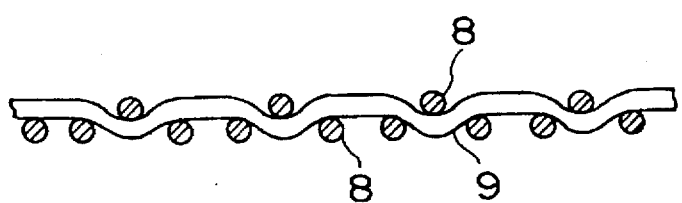
FIG. 3 is an explanatory view of a satin weave used in the present invention.

In the molding sheet materials 1 and 4 according to the present invention, examples of the reinforcing fiber constituting the reinforcing woven fabric or knitted web used in the core layer 2 and the skin layer 6 include a glass fiber, a carbon fiber, an aramid fiber, and a metallic fiber (for example, a steel fiber). Examples of the weave in the case of use of the woven fabric include a satin weave, a twill weave and a plain weave. Among them, satin weave and a twill weave are favorable. In the satin weave, one warp is woven by a weft, and two or three warps are then woven together by the weft. For example, as shown in FIG. 3, the warp 8 is woven in the number of warps of 1, 2, 1, 2 . . . in that order by the weft 9. In this case, the fiber is more easily moved than in the case where the warp is woven one by one. For this reason, in the press molding into a three-dimensional structure, the fiber moves along the three-dimensional structure to some extent, which prevents excessive tensile force to be applied, so that a uniform article can be prepared. The content of the reinforcing fiber in each of the core layer 2 and the skin layer 6 is usually in the range of from 30 to 70% (% by weight), particularly preferably in the range of from 50 to 65%.

The reinforcing random mat used in both the skin layer 3 and the core layer 5 may be in the form of a nonwoven fabric, such as glass paper, a chopped strand mat, a filament mat or a continuous strand mat. Examples of the reinforcing fiber material constituting these random mats include a glass fiber, a carbon fiber, an aramid fiber and a metallic fiber. The content of the reinforcing fiber in each of the skin layer 3 and the core layer 5 is usually in the range of from 30 to 50% (% by weight), particularly preferably about 40%. The reinforcing fiber used herein is randomly arranged, and use may be made of any of a staple and a filament. Since, however, the reinforcing effect lowers when the fiber length is small, the fiber length is preferably large. When a chopped strand mat is used as the random mat, the length of the chopped strand constituting the random mat is preferably in the range of from ½ to 4 in. When the length of the chopped strand is below this range, the reinforcing effect lowers, while when it is above this range, it is difficult to attain a homogeneous dispersion.

Examples of the resin matrix constituting the core layer and the skin layer include polyamide (e.g., nylon 6, nylon 66 or nylon 12), polypropylene, polycarbonate (PC), polybutylene terephthalate (PBT), polyphenylene sulfide, polyether ether ketone and PBT/PC alloy. Among them, nylon 6, polybutylene terephthalate and polyphenylene sulfide are preferred because they can be easily molded by virtue of their low viscosity. The same kind of a matrix resin is used for both the core layer and the skin layer constituting one sheet material. If necessary, use may be made of different kinds of matrix resins.

The thickness of each of the sheet material 1 and the sheet material 4 is determined by taking into consideration the thickness and moldability required in the final product produced by molding these sheet materials and usually in the range of about 1 to 3 mm, preferably about 2 mm. Although there is no particular limitation on the proportion of the thicknesses of the skin layer 3, core layer 2 and skin layer 3 in the sheet material 1, the proportion is preferably about 2:1:2. Further, although there is no particular limitation on the proportion of the thicknesses of the skin layer 6, core layer 5 and skin layer 6 in the sheet material 4, the proportion is preferably about 1:2:1.

The sheet material 1 and the sheet material 4 according to the present invention can be usually prepared by separately molding a sheet material for constituting each core layer and a sheet material constituting each skin layer and joining these sheet materials to each other by means of a press or the like. In this case, the sheet material previously molded for forming each core layer or each skin layer may be a sheet material consisting of a reinforcing material completely impregnated with a resin and substantially free from a bubble, or a sheet material wherein a reinforcing material and a matrix resin are appropriately adhered to each other and a number of voids remain in the inside thereof. When use is made of the latter sheet material, the resin can be sufficiently impregnated into the reinforcing material by heating under pressure in the joining process.

Examples of the form of the matrix resin used in the molding of the sheet material used in the core layer 2 or the skin layer 6 of the fiber reinforced thermoplastic resin reinforced with a woven fabric or a knitted web include a film, a powder and a fiber. Among them, the film is suitable from the viewpoint of the cost and handleability. The reinforcing woven fabric or knitted web is subjected to a surface treatment suitable for the matrix. For example, in the case of a glass fiber, the treatment is conducted by the conventional method through the use of a silane coupling agent, such as aminosilane, epoxysilane, methacrylsilane or chlorosilane. A matrix resin in the form of a film or the like is put on the woven fabric or knitted web subjected to the above-described treatment, and the assembly is heat-molded into a sheet material consisting of a reinforcing woven fabric or knitted web and a matrix resin. The resultant sheet material can be used as the core layer 2 or the skin layer 6.

Examples of the form of the matrix resin used in the molding of the sheet material used as the skin layer 3 or core layer 5 of the fiber reinforced thermoplastic resin reinforced with a random mat include a film, a powder and a fiber. Among them, the fiber is suitable from the viewpoint of the cost and handleability. When use is made of the fibrous matrix resin, for example, the reinforcing fiber and the resin fiber are doubled, cut into a chopped strand and brought into a mat form and the whole mat is heat-pressed to form a sheet material consisting of a chopped strand mat and a matrix resin. A sheet material composed of a filament mat consisting of a reinforcing fiber and a matrix resin can be prepared by subjecting a chopped strand as a reinforcing fiber together with a chopped strand as a matrix resin fiber to carding to form a filament mat and heat-pressing the filament mat. The sheet material thus prepared can be used for the skin layer 3 or the core layer 5.

When use is made of a glass fiber as a reinforcing fiber in the form of a blend with a resin fiber, it is preferred to use a binder which can enhance the adhesion to the resin and enhance the impregnating ability of the resin. Preferred examples of the binder include one having the following composition:

| film forming component: | |
|---|---|
| Epicot 828 | (produced by Yukashell Epoxy Kabushiki Kaisha) |
| ethylene oxide adduct | 3.0% |
| silane coupling agent: | |
| γ-aminopropyltriethoxysilane | 0.5% |
| lubricant: | |
| tetraethylenepentamine distearate | 0.05% |
| low molecular weight polyethylene emulsion | 0.1% |

The percentage adhesion of the binder is preferably about 0.2–1.0%.

In order to produce the sheet material 1 and the sheet material 4, instead of the method which comprises separately molding a sheet material for constituting each core layer and a sheet material for constituting each skin layer and joining these sheet materials to each other by means of a press or the like, use may be made of a method which comprises stacking a reinforcing fiber and a matrix resin for constituting a core layer and a reinforcing fiber and a matrix resin for constituting a skin layer and subjecting the whole assembly to heat molding under pressure to mold a core layer and a skin layer and, at the same time, to join the whole assembly, thereby preparing a sheet material 1 and a sheet material 4.

Figure 2A:
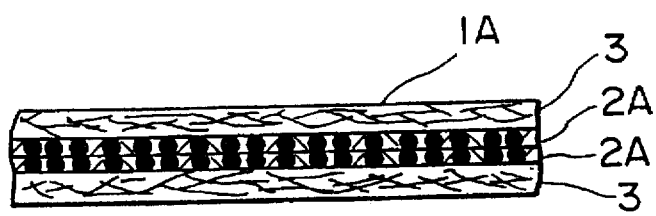
FIG. 2(a) is a schematic cross-sectional view of a structure of a molding sheet material described in claim 3.
Figure 2B:
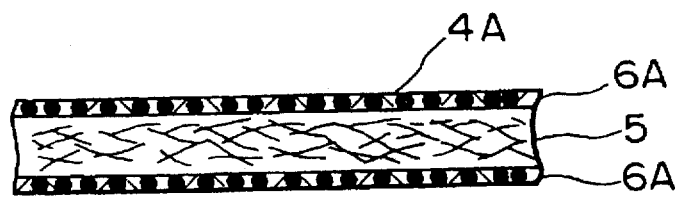
FIG. 2(b) is a schematic cross-sectional view of a structure of a molding sheet material described in claim 4.

In the above-described molding sheet materials 1 and 4, the core layer 2 or the skin layer 6 consists of a fiber reinforced thermoplastic resin reinforced with a woven fabric or a knitted web of a reinforcing fiber. Alternatively, the core layer or the skin layer may comprise a woven fabric or a knitted web of a reinforcing fiber alone. As shown in FIG. 2(a), the invention described in claim 3 consists in a molding sheet material 1A characterized by having a sandwich structure consisting of a core layer 2A of a woven fabric or a knitted web of a reinforcing fiber and, joined to both sides of the core layer 2A, skin layers 3 of a fiber reinforced thermoplastic resin reinforced with a random mat of a reinforcing fiber. As shown in FIG. 2(b), the invention described in claim 4 consists in a molding sheet material 4A characterized by having a sandwich structure consisting of a core layer 5 of a fiber reinforced thermoplastic resin reinforced with a random mat of a reinforcing fiber and, joined to both sides of the core layer 5, skin layers 6A of a woven fabric or a knitted web of a reinforcing fiber. The skin layer 3 and the core layer 5 used herein are the same as the skin layer 3 and the core layer 5, respectively, as shown in FIG. 1.

The sheet material according to the invention is used in the molding of a molded article of a fiber reinforced thermoplastic resin. The reinforcing fiber content of the whole sheet material is usually in the range of from about 30 to 60% by weight. Specifically, the reinforcing fiber content is determined by taking into consideration the strength, hardness, elasticity, moldability, etc., required of the article (molded article). When the content is excessively low, the strength is insufficient although the moldability is good. On the other hand, when the content is excessively high, although the hardness increases, the elasticity lowers and the molded article becomes fragile. Further, in this case, since the impregnating ability of the resin lowers, the molding becomes difficult. For this reason, the content is preferably in the range of from about 40 to 50% by weight.

There is no particular limitation on the applications of molded articles produced from the sheet materials according to the present invention, and the molded articles may be used in any application and is particularly favorable for applications where deep drawing and a high strength are required. Typical examples of the sheet material include a toe puff for a safety shoe. The invention described in claims 9–12 consists in a toe puff for a safety shoe produced by subjecting a molding sheet material having the above-described structure to heat molding under pressure.

Figure 4:
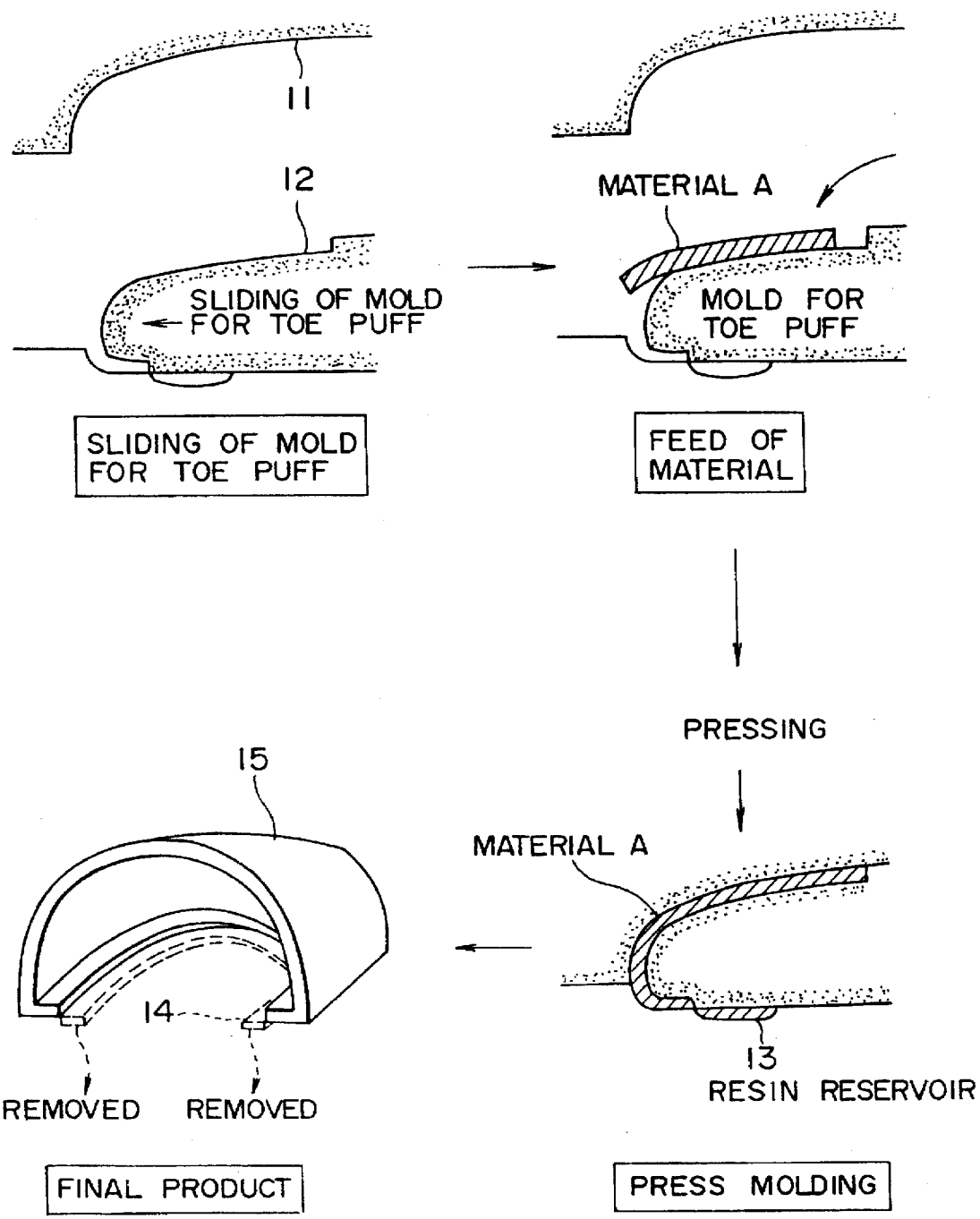
FIG. 4 is a flow sheet showing one embodiment of the process for molding a toe puff for a safety shoe described in claims 9–12.

FIG. 4 is a flow sheet showing one embodiment of the molding process under pressure for the production of a toe puff for a safety shoe through the use of the sheet material 1, 4, 1A or 4A shown in FIGS. 1 or 2. At the outset, a toe puff mold 12 is slid within a mold 11, and a material A formed by cutting the sheet material 1, 4, 1A or 4A into a shape close to the development of a final product is fed into the mold. The assembly is subjected to heat molding under pressure in the mold. At that time, excess material deposits in a resin reservoir 13. After the curing, the excessive material 14 in the resin reservoir is removed to obtain a toe puff 15 for a safely shoe as a final product.

Figure 5:
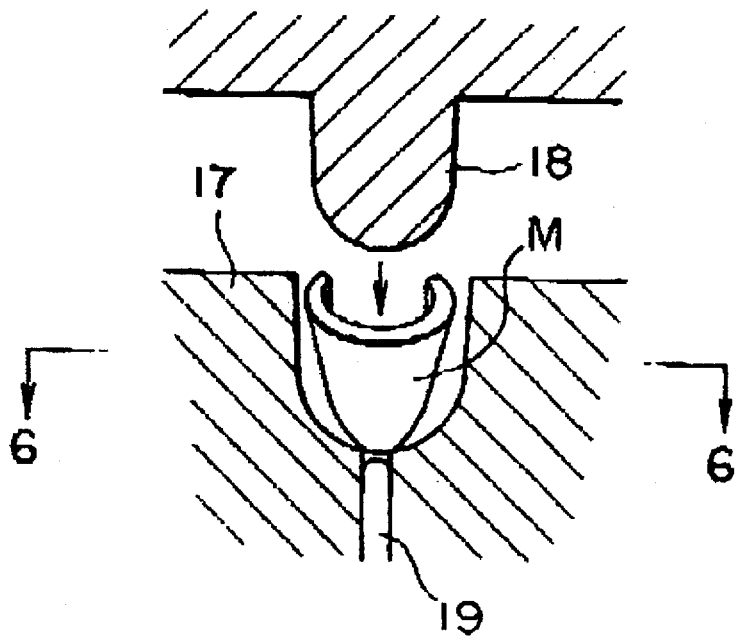
FIG. 5 is an explanatory diagram showing another embodiment of the process for molding a toe puff for a safety shoe.
Figure 6:
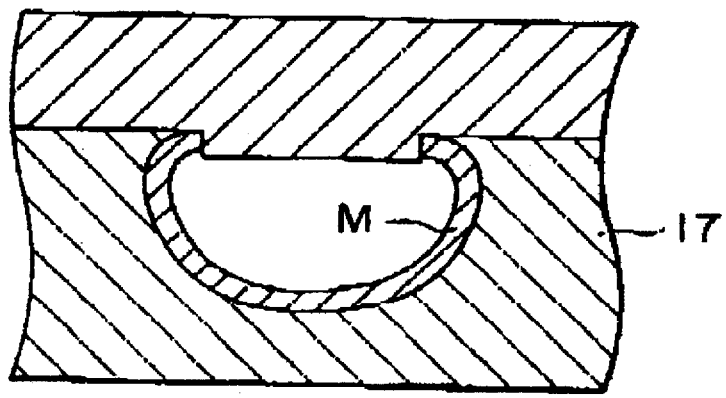
FIG. 6 is a cross-sectional view taken along line A—A of FIG. 5.

FIGS. 5 and 6 are each an explanatory diagram showing another embodiment of the molding process under pressure for the production of a toe puff for a safety shoe through the use of the sheet material shown in FIGS. 1 or 2. At the outset, the sheet material is cut into a shape close to the development of a final product and preliminarily heated in a far infrared oven to soften the shape, thereby preparing a base material M. The base material M is inserted into a mold 17 along the inside wall of the mold 17, and a core 18 is forced down to conduct compression molding. After the completion of molding, the resultant molded article is taken out of the mold by means of an ejector pin 19.

Figure 7:
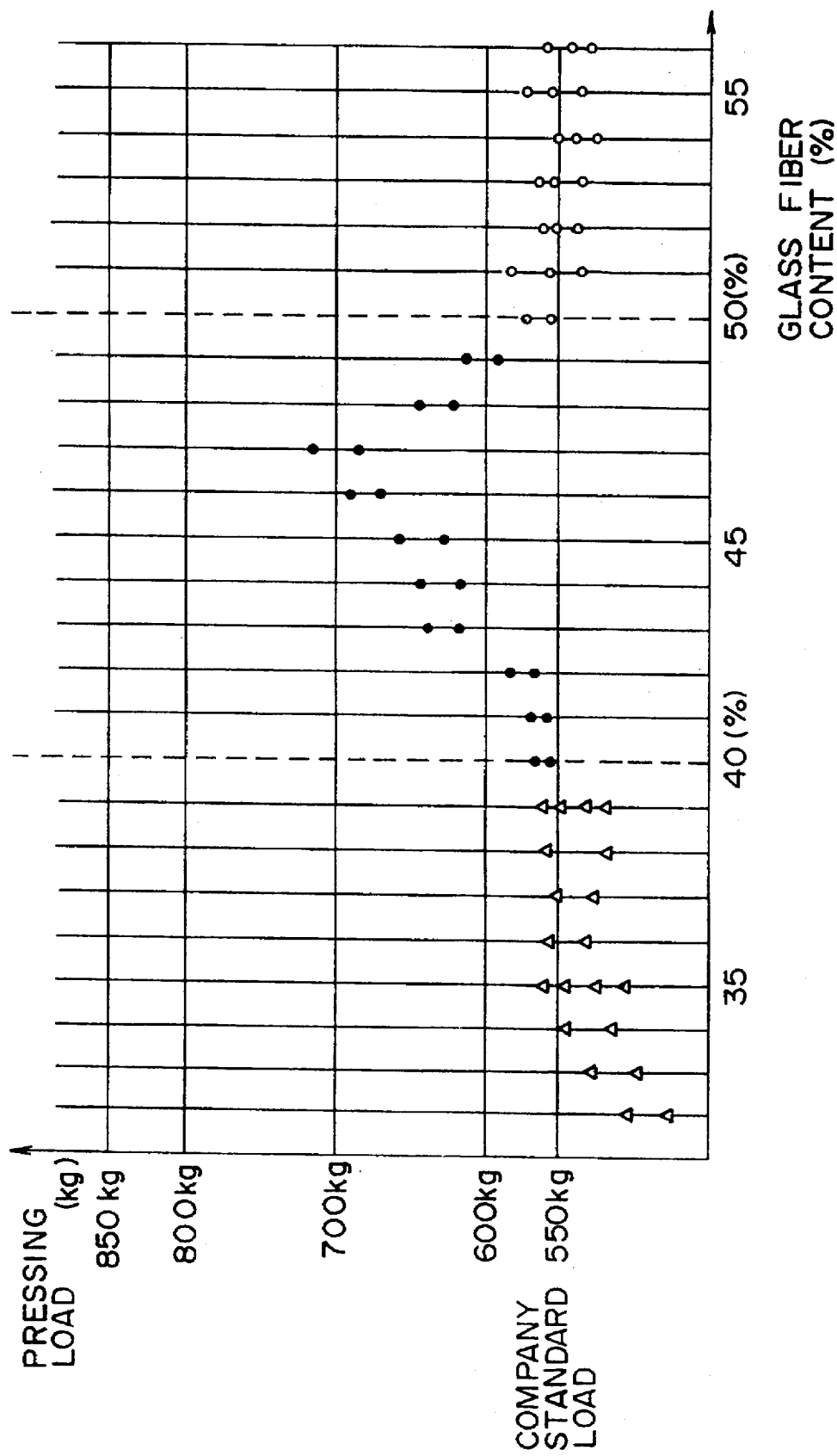
FIG. 7 is a graph showing the relationship between the glass fiber content and the load of a toe puff for a safety shoe.

The strength of pressing against the toe puff for a shoe is important as the strength required of the toe puff for a safety shoe. FIG. 7 is a graph showing the relationship between the content of a glass fiber in a thermoplastic resin matrix and the pressing load in the case where a toe puff for a safety shoe is molded through the use of a molding sheet material 4 having a structure shown in FIG. 1(b) wherein a glass fiber is used as a reinforcing fiber. Experimental conditions used for obtaining this graph were as follows.

Specifications of the molding sheet material 4:

| reinforcing fiber used: | glass fiber (filament diameter: 9 μm) |
|---|---|
| form of reinforcing fiber for skin layer 6: | glass cloth |
| form of reinforcing fiber for core layer 5: | chopped strand mat (strand length: 2 in.) |
| matrix resin: | nylon 6 |
| thickness ratio: | |
| skin layer:core layer:skin layer = 1:2:1 | |
| overall thickness: | 2 mm |

The total glass content was controlled through a combination of a core layer and a skin layer different from each other in the glass content.

Molding conditions for toe puff for shoe:
  sheet preheating condition: 325° C.×60 sec
  mold temperature: 120° C.
  molding pressure: 500 kg/cm$^2$ As is apparent from FIG. 7, the strength reaches the peak when the content of the glass fiber is in the range of from 40 to 50% by weight. According to the above-described JIS, since a pressing load of 450 kg suffices for passing the requirement of the class L, the pressing load value described as the company standard shown in FIG. 7, that is, 550 kg, is a numerical value having a sufficient margin for the factor of safety. For this reason, in the present invention, the glass fiber content is preferably in the range of from 40 to 50% by weight.

Figure 8:
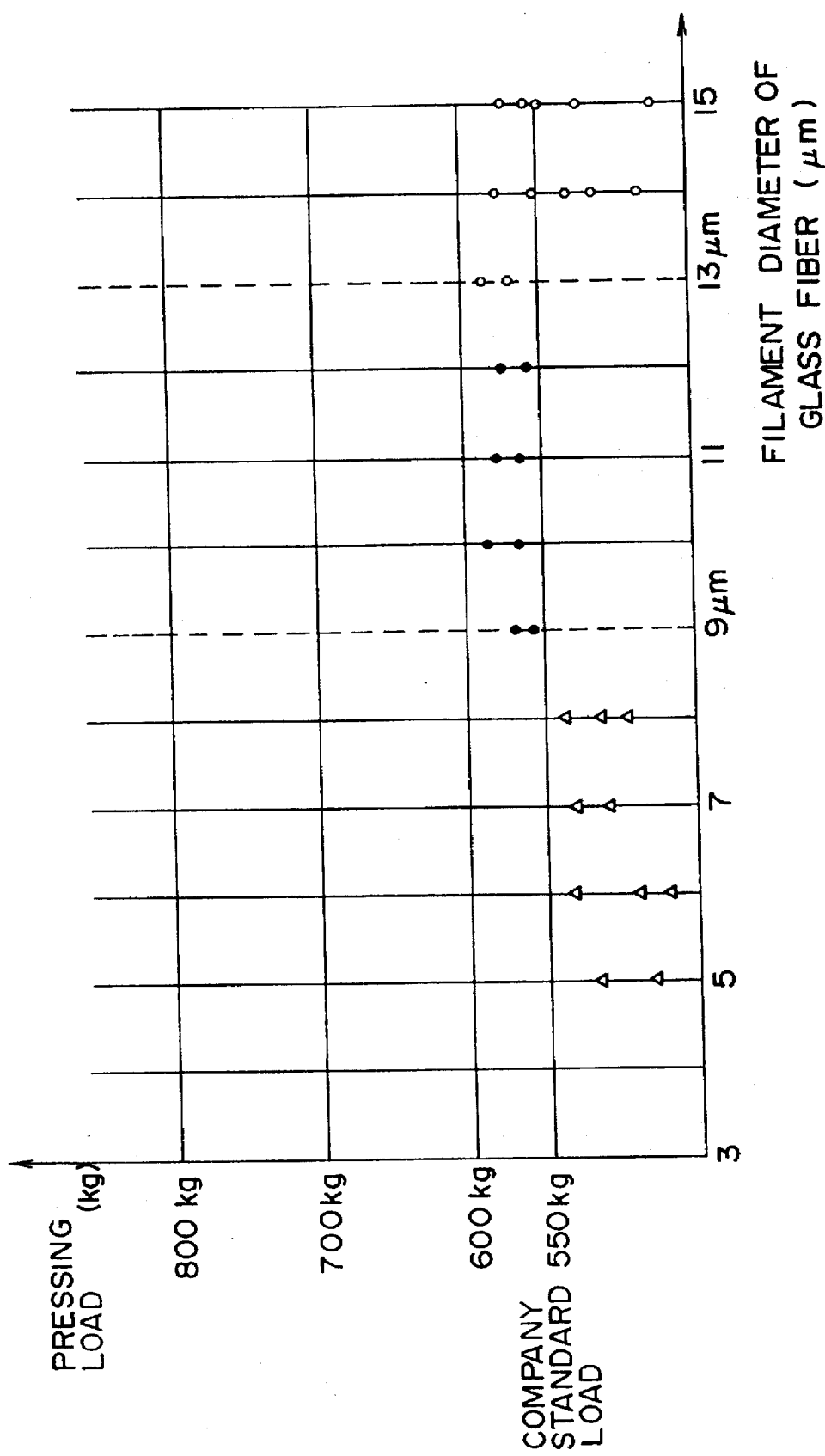
FIG. 8 is a graph showing the relationship between the filament diameter of a glass fiber and the load of a toe puff for a safety shoe.

FIG. 8 is a graph showing the relationship between the filament diameter and the load with the filament diameter of the glass fiber being varied and the content of the glass fiber being kept at 45% by weight (constant) in the case where a toe puff for a safety shoe is molded from a molding sheet material having the same structure as that of the sheet material used for obtaining data shown in FIG. 7. In FIG. 8, the load reaches the peak when the filament diameter is in the range of from 9 to 13 μm.

The reason for this is thought to be as follows.

When the filament diameter of the glass fiber is less than 9 μm, since the filament diameter is small, the surface area of the glass fiber increases. This makes it necessary to increase the amount of the resin for the purpose of improving the wettability of the entire fiber surface. Further, as the filament diameter decreases, the impregnation of the resin into the strand becomes insufficient, so that voids are liable to remain in the molded article. Therefore, a lowering in the glass content and an increase in the amount of residual voids lower the strength of the molded article. On the other hand, when the filament diameter of the glass fiber exceeds 13 μm, the flexibility of the fiber per se and the flowability lower and the fragility increases. Therefore, in the case of a toe puff for a shoe, the distribution of the glass fiber in the bent portion of the toe puff for a shoe becomes so poor that the amount of the resin becomes large in that portion, which makes it difficult to attain a necessary strength. Therefore, a predetermined strength can be more stably obtained by the addition of a limitation of the filament diameter of the glass fiber in addition to the limitation of the content of the glass fiber.

Since the sheet materials 1 and 4 shown in FIG. 1 and the sheet materials 1A and 4A shown in FIG. 2 each comprise a sheet material of a fiber reinforced thermoplastic resin, they can be used in hot stamping or high-speed compression molding. Further, since the resultant molded articles contain a reinforcing fiber in the form of a woven fabric or a knitted web, they have a high strength which is free from the anisotropy.

Further, in the molding of the sheet material 1 or 1A into a three-dimensional structure, the core layer 2 reinforced with a woven fabric or a knitted web or the core layer 2A consisting of a woven fabric or a knitted web alone has an improved conformability with the mold by virtue of the flowability of the skin layers 3 provided on both sides of the core layer 2 or 2A and reinforced with a random mat, such as a nonwoven fabric or a mat, and the skin layers 3 provided on both sides of the core layer 2 or 2A are soft and protect the core layer 2 or 2A, so that neither wrinkling nor crease occurs even in considerably deep drawing. Further, since the core layer 2 or 2A undergoes a tensile load during molding, the skin layers 3 are not elongated during the molding, so that no portion having a significantly small thickness occurs. Thus, a molded article having a three-dimensional structure and a good appearance can be produced.

In the molding of the sheet material 4 or 4A into a three-dimensional structure, the core layer 5 reinforced with a random mat, such as a nonwoven fabric or a mat, serves as a cushioning material to make flexible the skin layers 6 provided on both sides of the core layer 5 and reinforced with a woven fabric or a knitted web or the skin layers 6A consisting of a woven fabric or a knitted web alone in the deep drawing, so that the conformability with the mold is improved, which enables molding to be conducted without wrinkling or creasing even in considerably deep drawing. In this case as well, since the skin layers 6 or 6A undergo a tensile load during molding, the core layer 5 is not elongated during the molding, so that no portion having a significantly small thickness occurs. Thus, a molded article having a three-dimensional structure and a good appearance can be produced. When the sheet materials 1 and 1A are compared with the sheet materials 4 and 4A, in the molded articles from the sheet materials 1 and 1A, since each skin layer 3 has a surface reinforced with a random mat, they have surfaces having a more smooth and better appearance than those of the molded articles form the sheet materials 4 and 4A. However, the molded articles from the sheet materials 4 and 4A are superior in strength. These sheet materials can be properly used depending upon the applications of molded articles.

Since the toe puff for a safety shoe according to the present invention is produced by subjecting the above-described sheet material to heat molding under pressure, it has a good appearance and a high strength despite deep drawing.

The present invention will now be described with reference to the following Examples.

EXAMPLE 1

A molding sheet material 1 shown in FIG. 1(a) was prepared by the following method.

(1) Preparation of sheet material for core layer:

The following glass cloth and nylon 6 film were put on top of another to form a laminate consisting of four sheets of film/one sheet of glass cloth/two sheets of film/one sheet of glass cloth/four sheets of film, which was heat-pressed to melt the nylon 6 film, thereby preparing a sheet material wherein the glass cloth was buried in the resin. The glass content of the sheet material was 60% by weight. This sheet material was used as a sheet material for the core layer.

| glass cloth: | |
| --- | --- |
| yarn used: | ECG75 1/0 |
| | (filament diameter: 9 μm) |
| count: | warp 44 yarns/25 mm |
| | weft 33 yarns/25 mm |
| weave: | four harness of satin weave |
| weight: | 209 g/m² |
| surface treatment: | γ-aminopropyltriethoxysilane |
| | 0.5% |
| nylon 6 film: thickness: | 30 μm |

(2) Preparation of sheet material for skin layer:

A previously desized nylon 6 yarn and a glass yarn (filament diameter: 9 μm) subjected to sizing conformable with a resin mainly composed of an epoxy resin were doubled in a weight ratio of 60:40 and, at the same time, cut into a size of 2 in. to prepare a chopped strand (hereinafter abbreviated as "a chop"). The resultant chop comprised the glass yarn and the nylon 6 yarn well blended therewith. The chop was adjusted to 1400 g/m² and heat-set at a temperature of 250° C. to melt the nylon 6 yarn, thereby preparing a sheet material wherein the glass chop was buried in the resin. This sheet material was used as a sheet material for the skin layer.

(3) Molding of molding sheet material:

The above-described sheet material for the core layer and the sheet material for the skin layer were each cut into a size of 45 cm×45 cm and put in the order of sheet material for skin layer/sheet material for core layer/sheet material for skin layer in a frame having an inside size of 45 cm×45 cm and a thickness of 2.1 mm. This assembly was sandwiched between upper and lower mirror plates and pressed at a temperature of 260° C. under a pressure of 10 kg/cm² to prepare a completely impregnated molding sheet material 1 having a thickness of 2.1 mm and a structure shown in FIG. 1(a).

Figure 9:
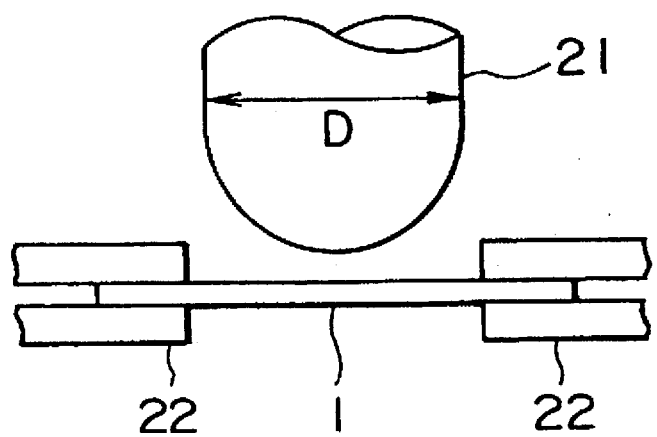
FIG. 9 is a schematic side view of one embodiment of a molding apparatus used in hot stamping.

(4) Hot stamping experiment:

The molding sheet material 1 thus prepared was placed in a far infrared oven provided with a conveyor and heat-softened under conditions of a temperature of 400° C., a conveyor speed of 20 m/min and a heating time of 40 sec. The molding sheet material 1 withdrawn from the oven was molded by means of a molding apparatus provided with a semispherical male mold 21 and clamping jigs 22 shown in FIG. 9. The diameter D of the male mold 21 was 250 mm. The jig 22 had such a structure that the periphery of the molding sheet material 1 could be clamped by a suitable force, and the shaping hole had a diameter of 255 mm. The temperatures of the male mold 21 and the jigs 22 were 80° C. and 220° C., respectively. The molding sheet material 1 withdrawn from the far infrared oven was quickly set between the jigs 22, and the male mold 21 was allowed to descend at a rate of 10 mm/min to press and shape the molding sheet 1.

Figure 10:
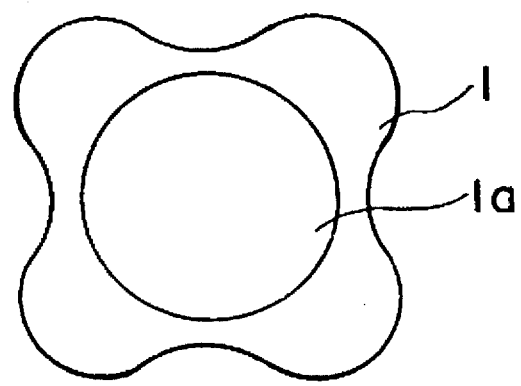
FIG. 10 is a schematic plan view of a molding sheet material of Example 1 after molding by means of the molding apparatus shown in FIG. 9.

As shown in FIG. 10, the material 1 after shaping had neither wrinkling nor creasing in the objective semispherical portion 1a, and very good results were obtained. When the semispherical portion 1a was cut out and subjected to a bending test, substantially no scattering of the strength was observed. The results are given in Table 1.

EXAMPLE 2

A molding sheet material 4 shown in FIG. 1(b) was prepared by the following method.

(1) Preparation of sheet material for core layer:

A blended chop consisting of the glass yarn and the nylon yarn used in the preparation of the sheet material for the skin in Example 1 was adjusted to 2100 g/m² and then subjected to heat setting to prepare a sheet material.

(2) Preparation of sheet material for skin layer:

The same sheet material for the core layer as that used in Example 1 was prepared and used as a sheet material for the skin layer.

(3) Molding of molding sheet material:

The above-described sheet material for the core layer and the sheet material for the skin layer were each put on top of the other and pressed in the same manner as that of Example 1 to prepare a completely impregnated molding sheet material 4 having a thickness of 2.1 mm shown in FIG. 1(b).

(4) Hot stamping experiment:

Hot stamping was conducted in the same manner as that of Example 1. The resultant molded article had neither wrinkle nor crease, and no significant difference in the bending strength was observed between each of the reinforcing materials and the woven fabric. The molded article was subjected to the measurement of properties, and the results are given in Table 1.

COMPARATIVE EXAMPLE 1

For comparison, a molding sheet material wherein the glass cloth alone was used as the reinforcing material was prepared, and subjected to hot stamping. Molding conditions, molding experiment conditions and results were as follows.

(1) Molding material used:

| glass cloth (GC) or the same type as that used in Example 1 | 10 sheets |
| --- | --- |
| nylon 6 film (PA6) of the same type as that used in Example 1 | 41 sheets |

(2) Number of sheets and sequence of lamination: 4PA6/GC/4PA6/GC/3PA6/GC/3PA6/GC/4PA6/GC/5PA6/GC/4PA6/ GC/3PA6/GC/3PA6/GC/4PA6/GC/4PA6

(3) Pressing conditions:

Pressing was conducted in the same manner as that of Example 1 to prepare a molding sheet material having a thickness of 2.05 mm.

(4) Hot stamping experiment:

Molding was conducted under the same condition as that of Example 1, except that the above-described molding sheet material was used. The molded article had a wrinkle in the bottom of the semispherical portion, and no complete molded article could be obtained. The properties of the molded article were measured, and the results are given in Table 1.

COMPARATIVE EXAMPLE 2

For comparison, a molding sheet material wherein a chopped strand mat alone was used as the reinforcing material, and subjected to the hot stamping experiment. Molding conditions, molding experiment conditions and results were as follows.

(1) Molding material:

A blended chop consisting of the glass yarn and the nylon 6 yearn used in the preparation of the sheet material for the skin layer in Example 1 was adjusted to 1600 g/m² and previously heat-set at 250° C. to prepare a sheet material.

(2) Lamination and pressing:

The sheet material was cut into a size of 45 cm ×45 cm, and two sheets of the cut material were pressed in the same manner as that of Example 1 to prepare a molding sheet material having a thickness of 2.1 mm.

(4) Hot stamping experiment:

Molding was conducted under the same condition as that of Example 1, except that the above-described molding sheet material was used. The resultant molded article had a good appearance. However, when a semispherical portion was cut out from the molded article and subjected to the measurement of bending strength, it exhibited a low strength and a large scattering in the strength.

The test results in the Examples and Comparative Examples are summarized in Table 1.

TABLE 1

| | Structure of reinforcing material | Flexutral strength (kg/mm²) | Coefficient of variation (Cv %) | Glass content (wt. %) |
| --- | --- | --- | --- | --- |
| Ex. 1 | chop/cloth/chop | 32.1 | 7.8 | 45 |
| Ex. 2 | cloth/chop/cloth | 50.4 | 5.4 | 50 |
| Comp. Ex. 1 | cloth | 56.1 | 1.4 | 60 |
| Comp. Ex. 2 | chop | 25.9 | 14.9 | 40 |

As is apparent from the results given in Table 1, in Example 2, the molded article exhibited substantially the same strength property as that of Comparative Example 1 wherein a cloth alone was used as the reinforcing material, and the moldability was superior. In Example 1, the variation in the property could be remarkably improved as compared with Comparative Example 2 wherein a chop alone was used as the reinforcing material.

EXAMPLE 3

Heat molding under pressure was conducted according to the process shown in FIG. 4 through the use of the sheet material prepared in Example 1 to prepare a toe puff for a safety shoe. Molding conditions were as follows:

sheet preheating conditions: 325° C.×60 sec mold temperature: 120° C.

molding pressure: 500 kg/cm²

The resultant molded article had a good appearance free from any of wrinkles, creases, etc. It was subjected to the measurement of the pressing load and found to be 650 kg.

COMPARATIVE EXAMPLE 3

There was prepared a molding sheet material (glass content: 45%, thickness: 2 mm) consisting of nylon 6 as a thermoplastic resin reinforced with a chopped strand mat (glass fiber length: 2 in., filament diameter: 9 μm), and the molding sheet material was subjected to heat molding under pressure in the same manner as that of Example 3. The pressing load of the resultant molded article was 370 kg, that is, did not reach the requirement specified in JIS.

EXAMPLE 4

There was prepared a sheet material for the skin layer comprising nylon 6 as a thermoplastic resin and, blended therewith, 38% by weight of a glass fiber having a filament diameter of 9 μm (length: 50 mm), and two sheets of the same glass cloth of satin weave as that used in Example 1 were sandwiched between the sheet materials for the skin layer at the central parts thereof. The laminate was integrally molded to a thickness of 2.2 mm, thereby preparing a sheet material 1A (overall glass content: 45%) shown in FIG. 2(a). The sheet material was cut into a shape close to the development of a final product, preheated and inserted into the mold 17 along the inside wall of the mold 17 as shown in FIG. 5, and the core 18 was forced down to conduct molding to prepare a toe puff for a safety shoe. The pressing load of the molded article sufficiently passed the company standard.

As described above, in the molding sheet material described and in claim 1 or 2 of the present application, despite the provision of a thermoplastic resin layer reinforced with a woven fabric or a knitted web, since it has a sandwich structure consisting of the thermoplastic resin layer as a core layer and, provided on both sides thereof, skin layers reinforced with a random mat, such as a woven fabric or a mat (claim 1), or a sandwich structure consisting of the thermoplastic resin layer reinforced with a woven fabric or a knitted web as the skin layer, the skin layers being provided on both sides of a core layer reinforced with a random mat, such as a nonwoven fabric or a knitted web (claim 2), the molding sheet material has such effects that shaping can be conducted without occurrence of a wrinkle, a crease or the like even in the case of molding of a considerably deeply drawn three-dimensional structure and a molded article having a three-dimensional structure having a high strength and a good appearance can be produced without the directionality of the strength.

Further, in the molding sheet material described in claim 3 or 4 of the present application, despite the use of a woven fabric or a knitted web as a reinforcing material, since it has a sandwich structure consisting of a core layer of a woven fabric or a knitted web and, provided on both sides thereof, skin layers reinforced with a random mat, such as a nonwoven fabric or a mat (claim 3), or a sandwich structure consisting of a skin layer of a woven fabric or a knitted web, the skin layers being provided on both sides of a core layer reinforced with a random mat, such as a nonwoven fabric or a mat (claim 4), the molding sheet material has such effects that shaping can be conducted without occurrence of a wrinkle, a crease or the like even in the case of molding of a considerably deeply drawn three-dimensional structure and a molded article having a three-dimensional structure having a high strength and a good appearance can be produced without the directionality of the strength.

Further, since the toe puff for a safety shoe according to the present invention is produced by subjecting the above-described molding sheet material to heat molding under pressure, advantageously it has a good appearance and a necessary strength and a smaller weight than that of the conventional steel toe puff for a safety shoe. In particular, the reinforcing effect can be further enhanced when a glass fiber is used as the reinforcing fiber in an amount in the range of from 40 to 50% by weight and has a filament diameter in the range of from 9 to 13 μm.

We claim:

1. A toe puff for a safety shoe produced by subjecting a molding sheet material to heat molding under pressure, the molding sheet material having a sandwich structure consisting of a core layer of a fiber reinforced thermoplastic resin reinforced with a woven fabric or a knitted web of a reinforcing fiber and, joined to both sides of the core layer, skin layers of a fiber reinforced thermoplastic resin reinforced with a random mat of a reinforcing fiber.

2. A toe puff for a safety shoe produced by subjecting a molding sheet material to heat molding under pressure, the molding sheet material having a sandwich structure consisting of a core layer of a fiber reinforced thermoplastic resin reinforced with a random mat of a reinforcing fiber and, joined to both sides of the core layer, skin layers of a fiber reinforced thermoplastic resin reinforced with a woven fabric or a knitted web of a reinforcing fiber.

3. A toe puff for a safety shoe produced by subjecting a molding sheet material to heat molding under pressure, the molding sheet material having a sandwich structure consisting of a core layer of a woven fabric or a knitted web of a reinforcing fiber and, joined to both side of the core layer, skin layers of a fiber reinforced thermoplastic resin reinforced with a random mat of a reinforcing fiber.

4. A toe puff for a safety shoe produced by subjecting a molding sheet material to heat molding under pressure, the molding sheet material having a sandwich structure consisting of a core layer of a fiber reinforced thermoplastic resin reinforced with a random mat of a reinforcing fiber and, joined to both sides of the core layer, skin layers of a woven fabric or a knitted web of a reinforcing fiber.

5. A toe puff for a safety shoe as claimed in claim 1, in which the reinforcing fiber is a glass fiber and the content of the glass fiber is in the range of from 40 to 50% by weight.

6. A toe puff for a safety shoe as claimed in claim 2, in which the reinforcing fiber is a glass fiber and the content of the glass fiber is in the range of from 40 to 50% by weight.

7. A toe puff for a safety shoe as claimed in claim 3, in which the reinforcing fiber is a glass fiber and the content of the glass fiber is in the range of from 40 to 50% by weight.

8. A toe puff for a safety shoe as claimed in claim 4, in which the reinforcing fiber is a glass fiber and the content of the glass fiber is in the range of from 40 to 50% by weight.

9. A toe puff for a safety shoe as claimed in claim 5, in which that the filament diameter of the glass fiber is in the range of from 9 to 13 μm.

10. A toe puff for a safety shoe as claimed in claim 6, in which that the filament diameter of the glass fiber is in the range of from 9 to 13 μm.

11. A toe puff for a safety shoe as claimed in claim 7, in which that the filament diameter of the glass fiber is in the range of from 9 to 13 μm.

12. A toe puff for a safety shoe as claimed in claim 8, in which that the filament diameter of the glass fiber is in the range of from 9 to 13 μm.

* * * * *

UNITED STATES PATENT AND TRADEMARK OFFICE
CERTIFICATE OF CORRECTION

PATENT NO. : 5,667,857
DATED : September 16, 1997
INVENTOR(S) : Shoichi WATANABE et al It is certified that error appears in the above-indentified patent and that said Letters Patent is hereby corrected as shown below:

TITLE PAGE:
Under "Related U.S. Application Data"
change "Division of Ser. No. 127,452, Sep. 23, 1993" to
---Division of Ser. No. 127,452, Sep. 27, 1993---.

Column 13, line 11; change "both side" to
---both sides---.
Column 14, line 11; change "which that the" to
---which the---.
Column 14, line 14; change "which that the" to
---which the---.
Column 14, line 17; change "which that the" to
---which the---.
Column 14, line 20; change "which that the" to
---which the---.

Signed and Sealed this

Seventeenth Day of February, 1998

Attest:

BRUCE LEHMAN

*Attesting Officer*     *Commissioner of Patents and Trademarks*